(12) United States Patent
Barthelemy et al.

(10) Patent No.: US 9,441,929 B2
(45) Date of Patent: Sep. 13, 2016

(54) TACTICAL MISSILE AND BALANCE WEIGHT FOR SAID MISSILE

(71) Applicant: MBDA FRANCE, Paris (FR)

(72) Inventors: Patrick Barthelemy, Marmagne (FR);
Phillippe Dubois, Pigny (FR); Laurent Carton, Saint Florent sur Cher (FR);
Nicholas Sibillaud, Bourges (FR);
Marc Ferrat, Saint Doulchard (FR);
Frederic Paintendre, Sceaux (FR)

(73) Assignee: MBDA FRANCE, LePlessis-Robinson (FR)

( * ) Notice: Subject to any disclaimer, the term of this patent is extended or adjusted under 35 U.S.C. 154(b) by 78 days.

(21) Appl. No.: 14/384,836

(22) PCT Filed: Mar. 18, 2013

(86) PCT No.: PCT/FR2013/000073
§ 371 (c)(1),
(2) Date: Sep. 12, 2014

(87) PCT Pub. No.: WO2013/144460
PCT Pub. Date: Oct. 3, 2013

(65) Prior Publication Data
US 2015/0041582 A1    Feb. 12, 2015

(30) Foreign Application Priority Data

Mar. 28, 2012  (FR) ...................................... 12 00928

(51) Int. Cl.
*F16F 15/32*  (2006.01)
*F42B 15/01*  (2006.01)
*F42B 10/02*  (2006.01)
*F16F 15/00*  (2006.01)
*F42B 15/00*  (2006.01)

(52) U.S. Cl.
CPC ............... *F42B 15/01* (2013.01); *F16F 15/32* (2013.01); *F42B 10/02* (2013.01)

(58) Field of Classification Search
CPC .......... F42B 10/02; F42B 15/01; F42B 8/12; F42B 8/14; F42B 8/16; F42B 12/02; F42B 12/36; F42B 12/46; F42B 12/50; F42B 12/56; F42B 12/58; F42B 12/60; F42B 12/72; F42B 12/74; F42B 12/745; F42B 12/76; F16F 15/32
USPC .................. 244/3.1, 3.23; 102/501, 502, 506, 102/514–516, 382, 386, 388, 389, 393
See application file for complete search history.

(56) References Cited

U.S. PATENT DOCUMENTS

| | | | |
|---|---|---|---|
| 3,433,534 A | 3/1969 | Mercer | |
| 4,072,107 A * | 2/1978 | Saxe | F42B 12/58 102/388 |
| 4,947,754 A * | 8/1990 | LaRocca | F42B 12/50 102/501 |
| 5,760,331 A * | 6/1998 | Lowden | F42B 12/74 102/506 |
| 6,371,029 B1 * | 4/2002 | Beal | F42B 12/745 102/506 |

(Continued)

OTHER PUBLICATIONS

ISA/EP International Search Report issued May 24, 2013 re PCT Application No. PCT/FR2013/000073, filed Mar. 18, 2013.

*Primary Examiner* — Bernarr Gregory
(74) *Attorney, Agent, or Firm* — Patrick J. Daugherty; Driggs, Hogg, Daugherty & Del Zoppo, LPA

(57) ABSTRACT

According to the invention, the balance weights of the missile are made from pellets whereof the particle size is at most equal to 1 mm which is enclosed in a closed package.

7 Claims, 1 Drawing Sheet

(56) References Cited

U.S. PATENT DOCUMENTS

| | | | |
|---|---|---|---|
| 6,722,283 B1 * | 4/2004 | Dindl | F42B 12/50 102/501 |
| 6,799,518 B1 * | 10/2004 | Williams | F42B 12/74 102/516 |
| 7,404,359 B2 * | 7/2008 | Muskat | F42B 12/74 102/506 |
| 7,509,911 B2 * | 3/2009 | Muskat | F42B 12/74 102/506 |
| 7,644,663 B2 * | 1/2010 | Illesi | F42B 8/16 102/502 |
| 8,393,273 B2 * | 3/2013 | Weeks | F42B 12/74 102/506 |
| 2006/0001309 A1 | 1/2006 | Krueger | |
| 2007/0108834 A1 | 5/2007 | Fogal, Sr. et al. | |
| 2010/0213755 A1 | 8/2010 | Fogal, Sr. | |

* cited by examiner

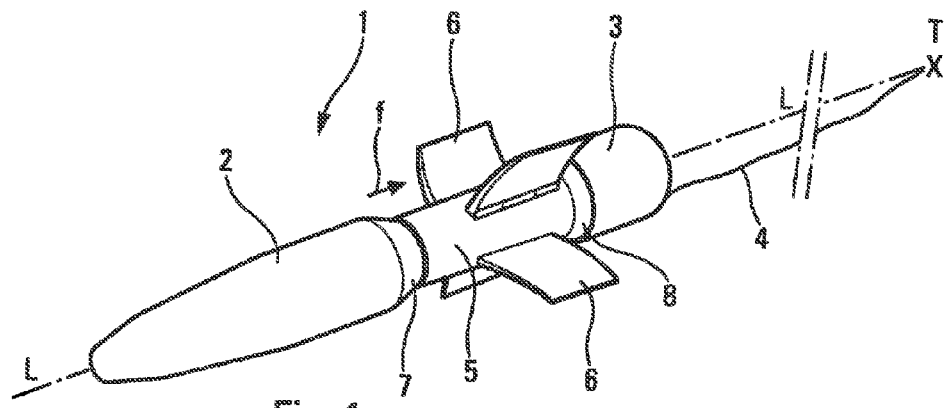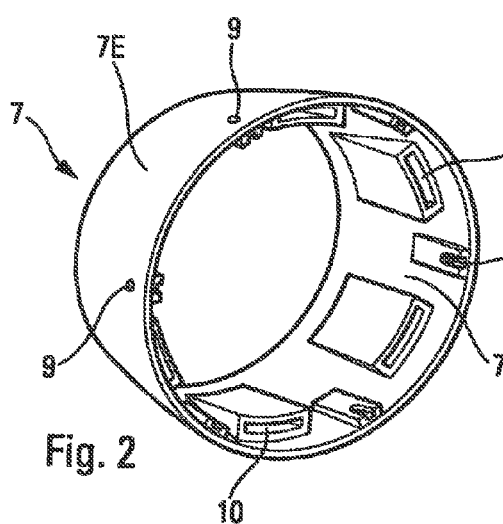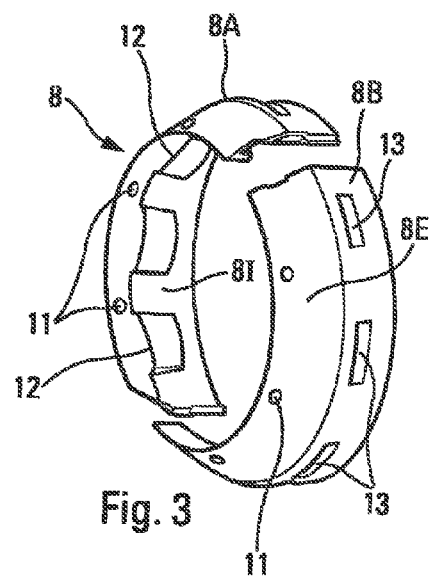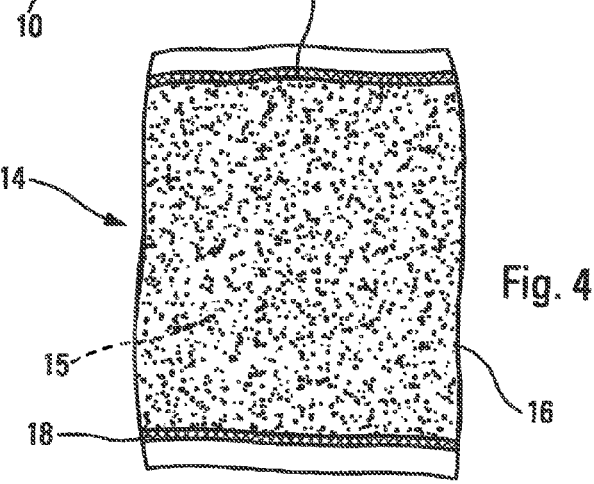

TACTICAL MISSILE AND BALANCE WEIGHT FOR SAID MISSILE

RELATED APPLICATION

This application is a national filing of PCT application Serial No. PCT/FR2013/000073, filed Mar. 18, 2013.

The present invention relates to tactical missiles and to their balancing. More particularly, although not exclusively, it relates to anti-tank missiles.

It is known that, in order to guarantee the flight of such a missile up to its point of impact, it is essential for the missile to be perfectly balanced by roll and along the longitudinal axis. To this end, the balancing of a missile using compact, large and heavy metal balance weights is already known, with these balance weights being fixed to the missile by drilling and bolting, for example.

Such a known procedure for balancing a missile is lengthy, complex and artisanal. Furthermore, it is dangerous as it is carried out on active missiles using high-risk tooling.

Furthermore, when the missile charge is detonated or when the missile propulsion unit accidentally explodes, these compact balance weights are propelled in any direction in the same way as shrapnel balls. Of course, if the detonation of the charge or the explosion of the propulsion unit occurs not far enough away from the firing station, it can result in damage to said firing station and, more seriously, in injuries to the personnel using said firing station.

The object of the present invention is to overcome these disadvantages by simplifying the procedure for balancing tactical missiles by roll and along the longitudinal axis, avoiding the use of dangerous tooling on active propulsion units and by preventing the balance weights from being able to be transformed into dangerous projectiles.

To this end, according to the invention, a balance weight for a tactical missile capable of rotating about its longitudinal axis is noteworthy in that it is formed by shot, the particle size of which is at most equal to 1 mm, with the average mass of the grains of the shot being less than 0.02 g, and which is housed in a closed package that can be disintegrated when the missile explodes.

Thus, under the effect of the detonation of the charge or of the possible explosion of the propulsion unit, the packaging of the shot is disintegrated and the shot forms a low powered shower, due to the smallness and the dispersion of the grains. The balance weights according to the present invention therefore cannot transform into dangerous projectiles.

Advantageously, the mass of the largest grains of the shot is at most equal to 0.04 g.

Preferably, in order to reduce the volume of said balance weight so that it can be easily housed inside the missile, the density of the material of said shot is at least equal to 15.

In an advantageous embodiment, the balance weight according to the present invention is formed by tungsten shot.

The package containing the shot can be a flexible sachet, preferably made of heat-sealable material.

Thus, the balance weight according to the present invention can be easily produced, as only the required mass of shot needs to be introduced into said sachet, and said sachet then can be closed by heat-sealing.

Of course, in order to obtain precise balancing of said tactical missile, it is advantageous for a set of balance weights with differing masses to be produced in advance, which balance weights are consistent with the balance weight of the invention described above.

In order to facilitate the installation of said balance weights on said missile, cells are advantageously provided that are capable of receiving said balance weights. Such cells are preferably made in the inner face of at least one aerodynamic cowling of said missile. Therefore, as such a cowling is generally mounted in a detachable manner, it is easy to introduce said balance weights into the cells that it comprises. As a variant, said cells can be accessed from outside, through openings that can be plugged after the installation of the balance weights, using an adhesive tape, for example.

In the case in which said tactical missile comprises at least one shoulder between two parts with different diameters, and an aerodynamic transition cowling covering said shoulder, it is advantageous for said cells to be made in the inner face of said aerodynamic transition cowling.

The figures of the accompanying drawing will be useful for understanding how the invention can be produced. In these figures, identical reference numerals designate similar elements.

FIG. 1 shows, as a perspective and in-flight view, an example of a tactical missile to which the invention is applied.

FIG. 2 is a perspective rear view of a first aerodynamic transition cowling of the missile of FIG. 1.

FIG. 3 is a perspective front view of a second aerodynamic transition cowling of the missile of FIG. 1.

FIG. 4 shows a balance weight for the missile of FIG. 1.

The tactical missile 1, according to the present invention and shown by way of example in FIG. 1, is of the wire-guided anti-tank missile type. At the front, the missile 1 comprises a detonating charge 2, whereas a coil 3 is provided at the rear, from which the guide wire 4 is unwound that a gunner T (represented by a single cross) can use to guide said missile 1 to a target (not shown). Between the front charge 2 and the rear coil 3, the missile 2 comprises a propulsion unit 5, of the propellant type, for example. The propulsion unit 5 has fins 6 for setting the missile 1 into rotation about its longitudinal axis L-L.

Furthermore, the diameter of the propulsion unit 5 is less than that of the front charge 2 and of the rear coil 3, so that said missile 1 has a first shoulder between the front charge 2 and the propulsion unit 5, and a second shoulder between the propulsion unit 5 and the rear coil 3.

In FIG. 1, said first and second shoulders cannot be seen, as they are respectively covered by first and second aerodynamic transition cowlings, 7 and 8.

As can be seen on a larger scale in FIG. 2, the first aerodynamic transition cowling 7 is in the shape of a single-piece crown, perforated with holes 9 for the passage of screws (not shown) that can fix said first aerodynamic transition cowling 7 to the missile 1. The outer face 7E of said first aerodynamic transition cowling 7 is conical so as to aerodynamically connect the front charge 2 to the propulsion unit 5, whereas the inner face 71 of said first cowling has internal cells 10, which are equidistantly distributed around the circumference.

For its part, as shown in the larger scale of FIG. 3, the second aerodynamic transition cowling 8 is in the shape of a crown divided into two diametral parts 8A, 8B (in order to facilitate its assembly) and perforated with holes 11 for the passage of screws (not shown) that can fix said parts to the missile 1. The inner face 81 of the aerodynamic transition cowling 8 comprises internal cells 12, which can be accessed from outside through openings 13. When the two diametral parts 8A, 8B are fixed to the missile 1 to form said second aerodynamic transition cowling 8, the outer face 8E of said cowling is at least partly conical so as to aerodynamically connect the propulsion unit 5 to the coil 3.

In FIG. 4, a balance weight 14 is shown according to the present invention, which balance weight is designed to balance the missile 1 by roll and also along its longitudinal axis L-L.

The balance weight 14 is formed by a low-mass shot 15 housed in a closed package 16.

The particle size of the shot 15 is small, at most equal to 1 mm, but the density of its constituent material is high, at least equal to 15. Preferably, the average mass of the grains of the shot is less than 0.02 g, whereas the mass of the largest grains of said shot is at most equal to 0.04 g. Advantageously, such shot is tungsten shot.

With regard to the packaging 16, this can be a flexible sachet, preferably made of a thermoplastic heat-sealable material and closed, for example, by two heat-sealed lines, 17 and 18.

Therefore, the production of the balance weight 14 is particularly simple and it is easy to produce a set of balance weights 14 with differing masses, ranging from 2 to 12 g, for example.

In order to balance the missile 1, it is mounted on a known balancing machine (not shown), which is capable of setting said missile into rotation about its longitudinal axis L-L and of detecting imbalances.

In order to remove these imbalances, balance weights 14 with suitable masses are introduced:
- through the openings 13 into the internal cells 12 of the aerodynamic transition cowling 8; and/or
- into the internal cells 10 of the aerodynamic transition cowling 7, after having detached said cowling from said charge 2 (removal of the screws passing through the holes 9) and after sliding it over said missile (see the arrow f in FIG. 1).

After reassembly of the aerodynamic transition cowling 7 on the shoulder separating the charge 2 and the propulsion unit 5, any remaining imbalances are identified using said balancing machine. The preceding operations are repeated until satisfactory balancing is obtained for said missile 1.

When the charge 2 or the propulsion unit 5 explodes, so does the missile 1, and the packages 16 of the balance weights (disposed in the cells 10 and/or 12 of the aerodynamic transition cowlings 7 and/or 8) are volatilised and the shot 15 is projected about the missile 1.

Due to the small particle size and the low mass of the grains of the shot 15, none of them can become a dangerous projectile. Furthermore, experience has shown that, upon the explosion of the missile 1, said shot is itself then at least partly volatilised.

The invention claimed is:

1. A system for Balance weight for a tactical missile capable of rotating about its longitudinal axis, the system comprising:
   shot having a plurality of grains with a particle size of at most 1 millimeter, and an average mass of the grains of the shot of less than 0.02 grams;
   a closed package housing the shot;
   a tactical missile comprising at least one aerodynamic cowling; and
   cells formed in an inner face of said at least one aerodynamic cowling for housing said closed package housing the shot;
   wherein the tactical missile is balanced in rotating about its longitudinal axis by the shot, and wherein the closed package housing the shot disintegrates when the tactical missile comprising the closed package explodes in response to at least one of a detonation of a charge of the tactical missile and an explosion of a propulsion unit of the tactical missile.

2. The system according to claim 1, wherein the mass of largest grains of said shot is at most equal to 0.04 grams.

3. The system according to claim 1, wherein the shot is tungsten shot.

4. The system according to claim 1, wherein said package is a flexible sachet.

5. The system according to claim 4, wherein said flexible sachet is made of a heat-sealable material.

6. The system of claim 1, wherein the shot grains comprise a plurality of balance weights with different masses.

7. The system according to claim 1, wherein the tactical missile further comprises:
   at least one shoulder between two parts with different diameters; and
   wherein the at least one aerodynamic cowling comprises at least one aerodynamic transition cowling covering said at least one shoulder; and
   wherein said cells are formed in an inner face of the at least one aerodynamic transition cowling.

* * * * *